(No Model.)
I. A. FULLER.
WATER LEVEL INDICATOR AND ALARM.
No. 423,680. Patented Mar. 18, 1890.
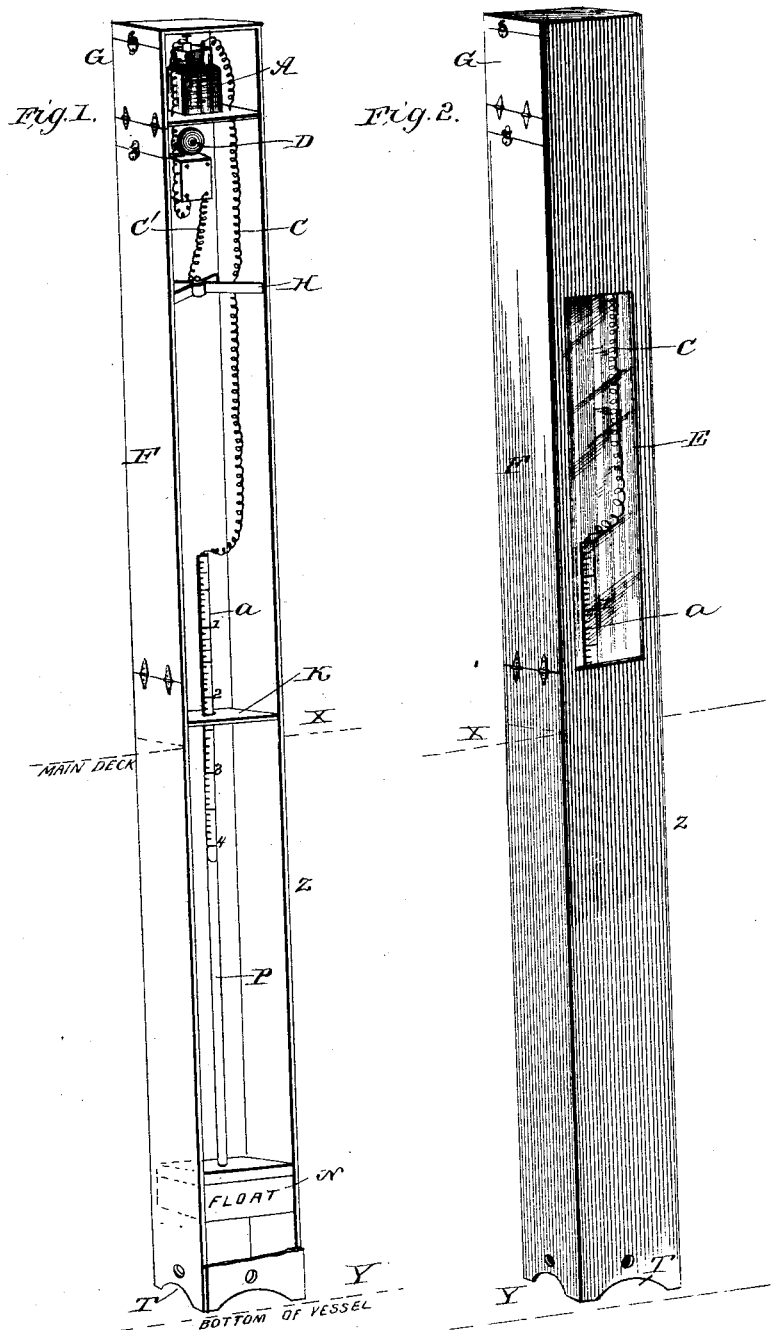
WITNESSES:
Fred G. Dieterich
Edw. W. Byrn
INVENTOR
Ira A. Fuller.
BY Munn & Co.
ATTORNEY

UNITED STATES PATENT OFFICE.

IRA ALRADO FULLER, OF PEPIN, WISCONSIN.

WATER-LEVEL INDICATOR AND ALARM.

SPECIFICATION forming part of Letters Patent No. 423,680, dated March 18, 1890.

Application filed July 26, 1889. Serial No. 318,795. (No model.)

*To all whom it may concern:*

Be it known that I, IRA ALRADO FULLER, of Pepin, in the county of Pepin and State of Wisconsin, have invented a new and useful Improvement in Water Indicators and Alarms for Vessels, of which the following is a specification.

The object of my invention is to provide an indicator and alarm for automatically giving notice of the amount of water that may have leaked into the hold of a vessel; and to this end it consists in the peculiar construction and arrangement of a float with indicator-gage and an electric circuit with contact-closer, battery, and bell, all worked by the float, as hereinafter fully described.

Figure 1 is a front elevation in perspective of the indicator and alarm, the case being opened by the removal of the front board. Fig. 2 is a perspective view of the same from the outside.

Z is the case of the instrument, which may be made of any length and width, and either square, as shown, or round, and of any suitable material, such as copper, brass, galvanized iron, or even wood. The lower end of the case is cut away or provided with openings at T to permit the water to gain access to the interior, and this end of the instrument is located in the hold of the vessel and at the bottom Y of the same. The main deck of the vessel is shown at X, and the instrument is made long enough to extend far enough above the main deck to permit the indications to be easily read. In the bottom end of the case there is arranged to slide vertically a float N, which has attached to it a rod P, whose upper end is provided with graduations in feet and inches. A partition K, just above the main deck, is placed in the case and forms a guide for the gage-bar P to pass through.

In the top part of the case and supported upon a shelf there is disposed a galvanic battery A, whose wires C C' extend down into the case and one of which has an electric bell D in the circuit. One of these circuit wires C' is connected to an adjustable spider-frame H, and the other wire is connected to the upper end of the gage-bar, and is adapted to be brought into contact with the spider-frame to close the circuit and sound an alarm on the bell whenever the float is raised high enough to cause the gage-bar to touch the spider-frame. The spider-frame H may be adjusted in the case by sliding it up or down, being held to its position either by frictional contact or by a set-screw. This distance above the gage-bar to which the spider-frame is adjusted indicates the rise of water in the hold which may take place before the alarm is sounded. By adjusting the frame H higher or lower this alarm may be given at any level of the water that may be required.

E is a glass window in the front of the case, through which the graduations at *a* on the bar P are visible, the number of feet and inches on this bar P above the lower edge of the window serving to indicate the depth of water in the hold of the vessel.

F G are hinged doors by which access may be had to the battery and working parts of the device.

I am aware that it is not new to have a float provided with a graduated rod and arranged to rise and fall within a case to indicate the height of the water; and I am also further aware that it is not broadly new to close an electric circuit and sound an alarm on a bell by the use of a float, and I therefore only claim my peculiar construction and arrangement of parts as a whole.

Having thus described my invention, what I claim as new is—

The combination of the casing Z, having window E and doors F G and a guide-frame or partition K, the float N, with rod P extending up through the guide-frame K and graduated at its upper end, the adjustable spider-frame H, held within the outer casing, and a galvanic battery and bell A D, having one wire connected to the spider-frame and the other to the rod P, substantially as and for the purpose described.

IRA ALRADO FULLER.

Witnesses:
A. S. GRAY,
H. C. B. FULLER.